United States Patent
Hehn et al.

(10) Patent No.: US 12,095,551 B2
(45) Date of Patent: Sep. 17, 2024

(54) METHOD AND CONTROL APPARATUS FOR CONFIGURING A CHANNEL CODING DURING A TRANSMISSION OF DATA PACKETS FROM A TRANSMITTER TO A RECEIVER, AND MOTOR VEHICLE

(71) Applicant: AUDI AG, Ingolstadt (DE)

(72) Inventors: Thorsten Hehn, Ingolstadt (DE); Christina Heindl, Egweil (DE)

(73) Assignee: AUDI AG, Ingolstadt (DE)

( * ) Notice: Subject to any disclaimer, the term of this patent is extended or adjusted under 35 U.S.C. 154(b) by 281 days.

(21) Appl. No.: 17/608,324

(22) PCT Filed: Feb. 10, 2020

(86) PCT No.: PCT/EP2020/053291
§ 371 (c)(1),
(2) Date: Nov. 2, 2021

(87) PCT Pub. No.: WO2020/224816
PCT Pub. Date: Nov. 12, 2020

(65) Prior Publication Data
US 2022/0224436 A1    Jul. 14, 2022

(30) Foreign Application Priority Data
May 9, 2019   (DE) ...................... 10 2019 206 666.6

(51) Int. Cl.
*H04L 1/00*   (2006.01)
(52) U.S. Cl.
CPC .................. *H04L 1/0009* (2013.01)
(58) Field of Classification Search
CPC ..... H04L 1/00; H04L 1/16; H04L 1/18; H04L 1/20; H04L 12/24; H04L 12/54;
(Continued)

(56) References Cited

U.S. PATENT DOCUMENTS 7,450,587 B2 * 11/2008 Gruhn ................... H04W 28/06
                                                  370/473
7,813,742 B1 * 10/2010 Mitchell ............... H04L 1/0009
                                                  455/456.3
(Continued)

FOREIGN PATENT DOCUMENTS

CN        102739378 A       10/2012
CN        103109483 A        5/2013
(Continued)

OTHER PUBLICATIONS

International Preliminary Report on Patentability directed to related International Patent Application No. PCT/EP2020/053291, completed Jul. 9, 2021, with attached English-language translation; 11 pages.

(Continued)

*Primary Examiner* — Man U Phan
(74) *Attorney, Agent, or Firm* — Sterne, Kessler, Goldstein & Fox P.L.L.C.

(57) ABSTRACT

The present disclosure relates to a method for configuring a channel coding during a transmission of data packets from a transmitter to a receiver, which are both located in a traffic environment, wherein a control apparatus of the transmitter ascertains environment data, describing the traffic environment, and orientation data, describing a relative orientation of the transmitter and the receiver, and the environment data and the orientation data are taken as a basis for using a radio link model to forecast, by means of a forecast, whether a currently selected coding configuration of the channel coding can be used to successfully decode and/or reconstruct a data packet currently needing to be sent in the receiver, and if the forecast signals a lack of success, then a switch is effected to an extended coding configuration that produces greater redundancy than the current coding configuration, (Continued)

and the data packet to be sent is sent using the extended coding configuration.

9 Claims, 2 Drawing Sheets

(58) Field of Classification Search
CPC . H04L 12/56; H04L 25/02; G01S 3/04; G01S 7/02; G01S 5/02; H04W 4/02; H04W 8/00; H04W 76/02; H04W 24/00; H04W 28/06; H04W 92/10; H04B 7/10; H04B 7/15; H04B 7/26; H04B 17/00; H04B 7/00; H04B 1/38
USPC ............................................................ 370/329
See application file for complete search history.

(56) References Cited

U.S. PATENT DOCUMENTS

| | | | | |
|---|---|---|---|---|
| 7,840,220 B1* | 11/2010 | Mitchell | ............... | H04L 1/0009 455/452.2 |
| 8,645,786 B2* | 2/2014 | Michel | .................. | H04L 1/1845 714/751 |
| 8,682,265 B2 | 3/2014 | Tsujimoto et al. | | |
| 8,976,847 B2* | 3/2015 | Schober | ................ | H04L 1/0009 375/264 |
| 9,807,566 B2* | 10/2017 | Alieiev | .................. | G01S 19/426 |
| 10,084,569 B2* | 9/2018 | Xu | ......................... | H04L 1/0061 |
| 10,693,726 B2* | 6/2020 | Ravanshid | ............ | H04L 1/0018 |
| 11,362,767 B2* | 6/2022 | Göktepe | .............. | H04L 1/1671 |
| 11,515,962 B2* | 11/2022 | Zhou | ...................... | H04L 1/0076 |
| 11,751,028 B2* | 9/2023 | Reimann | ................. | H04W 4/02 370/252 |
| 2003/0177436 A1* | 9/2003 | Gruhn | ................... | H04L 1/1819 714/776 |
| 2011/0269410 A1 | 11/2011 | Tsujimoto et al. | | |
| 2013/0128876 A1 | 5/2013 | Kilian et al. | | |
| 2023/0345265 A1* | 10/2023 | Pfadler | ................... | H04W 4/40 |

FOREIGN PATENT DOCUMENTS

| | | |
|---|---|---|
| DE | 102015214968 A1 | 2/2017 |
| JP | 3669355 B2 | 7/2005 |
| WO | WO 2017/027355 A1 | 2/2017 |
| WO | WO 2018127421 A1 | 7/2018 |
| WO | WO 2018234484 A1 | 12/2018 |

OTHER PUBLICATIONS

International Search Report and Written Opinion of the International Searching Authority directed to related International Patent Application No. PCT/EP2020/053291, mailed Jun. 4, 2020, with attached English-language translation; 17 pages.

* cited by examiner

METHOD AND CONTROL APPARATUS FOR CONFIGURING A CHANNEL CODING DURING A TRANSMISSION OF DATA PACKETS FROM A TRANSMITTER TO A RECEIVER, AND MOTOR VEHICLE

TECHNICAL FIELD

The present disclosure relates to a method for configuring a channel coding which is used during a transmission of data packets. The data packets are transmitted from a transmitter to a receiver, which are both in a traffic environment and at least one of which is moving. For example, the transmitter can be arranged in a transmitting vehicle and/or the receiver can be arranged in a receiving vehicle. The present disclosure also includes a motor vehicle which can be operated as a transmitting vehicle. Finally, the present disclosure also includes a control apparatus by means of which a transmitter can be operated according to the method.

BACKGROUND

When data packets are transmitted, interference on the radio link can lead to corruption of the transmission signals, which in a receiver can result in the data contained in the data packet no longer being able to be correctly reconstructed because an unknown number of data bits has flipped. This can be detected, for example, using a checksum. There is also the possibility of making the data in data packets reconstructable by means of a so-called forward error correction, if the corruption is sufficiently low. In general, this provision of additional redundancy (additional bits) is referred to as channel coding. If the data packet cannot be completely reconstructed even then, the retransmission of the data packet can be requested or ordered from the receiver in the transmitter, which is referred to as an ARQ (Automatic Repeat Request). If the transmitter is then informed of the difficulties in decoding the data packets, it can on the one hand retransmit a data packet and on the other hand adaptively adjust the configuration of the coding in order to avoid future transmission errors. This combination of adaptive coding and retransmission of non-reconstructable data packets is referred to as a hybrid ARQ (HARQ—Hybrid Automatic Repeat Request). A HARQ process is understood to be a method in which the channel coding and the additional transmission of redundancy work together in order to increase the probability of a successful decoding of the transmitted information or data packets.

A further development of this is the blind HARQ, where the additional redundancy in the channel coding is not specifically requested by the receiver, but is added to the original transmission after a decision by the transmitter. This can result in additional redundancy (additional data bits that are transmitted in the data packets), which may not be necessary. This additional redundancy in the blind HARQ process results in an increased utilization of the communication channel, which means that user data can only be transmitted at a lower transmission rate. In addition, the increasing channel load means that other transmitters can only access the transmission channel to a lesser extent, because the risk of a packet collision increases, which in turn can lead to incorrect transmission of the transmitted data packets, i.e. it has a counterproductive effect on the protection of the data packets.

From JP 2003 198 441 A, it is known to align a directive transmitting antenna in such a way that a receiving vehicle still has sufficient radio reception when there is a shielding object between transmitting antenna and receiving vehicle. Where shielding objects are located can be indicated in advance by means of a map. The disadvantage of this solution is that the map has to be ascertained individually for each region, which is complicated.

From WO 2017/027355 A1 it is known to switch between different configuration data sets in the case of direct communication between mobile terminals by means of D2D-LTE (Device to Device Long Term Evolution) in the transmitter and in the receiver. This can also be carried out depending on a current position of one of the devices. The transmission can be carried out by means of the HARQ process described. However, this also requires an area to be completely surveyed in order to facilitate the correct selection. The selection can also be made depending on further status parameters of the radio link, but these can only be measured afterwards when a data packet has already been transmitted, so that a precautionary configuration of the channel coding is possible for a data packet.

From U.S. Pat. No. 8,682,265 B2 it is known to switch over to different radio links (direct view, over the horizon, toward a flying object) depending on where the receiver is currently located and whether the receiver is currently moving. An adaptation of the channel coding results only regionally, i.e. with the same environment and only varying relative orientation between transmitter and receiver, there is no possibility of adaptation.

A position-based channel coding system for communication devices is known from U.S. Pat. No. 7,813,742 B1. The apparatus may have one or more of the following features: (a) a GPS receiver capable of receiving position data from GPS satellites; (b) a radio frequency transceiver (RF) having at least a first and a second channel; (c) a database for a geographic information system (GIS) with topographic data; (d) a processor that can optimize the transmitted parameters of the RF transceiver based on the position data and the topographical data, and (e) a bus that connects the GPS receiver, the RF transceiver, the GIS database and the processor to each other.

A method and a device are known from DE 10 2015 214 968 A1, which are used to adapt at least one parameter of a communication system between two participants.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Figure 1:
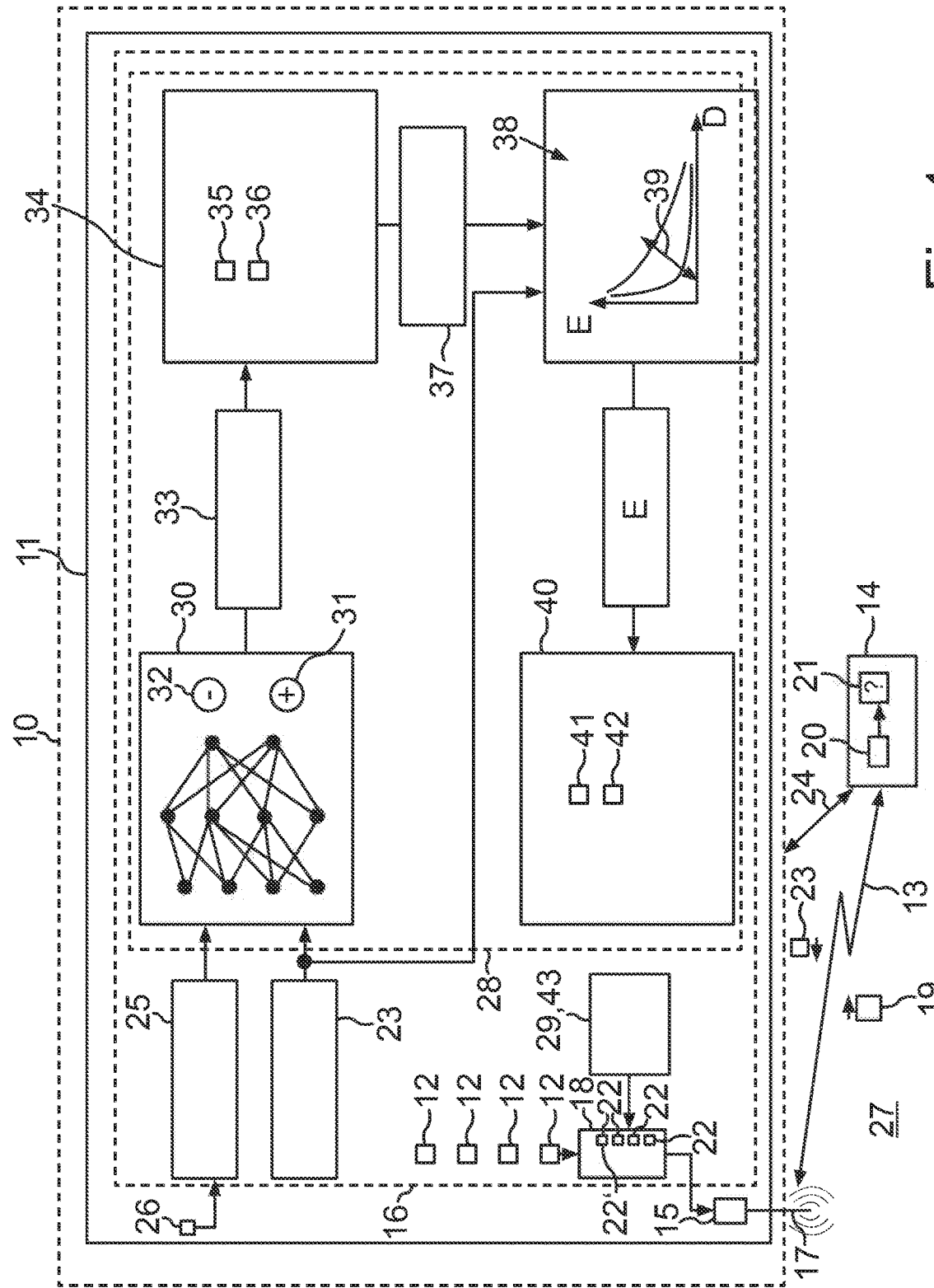
FIG. 1 shows a schematic illustration of the vehicle, according to certain embodiments of the invention.

The object of the present disclosure is adapting or configuring a channel coding with little need for data exchange between transmitter and receiver.

The object is achieved by the subject matter of the independent claims. Advantageous embodiments of the invention are described by the dependent claims, the following description and the figures.

Embodiments of the invention provide a method for parameterizing or configuring a channel coding during a transmission of data packets from a transmitter to a receiver. The method is based on the assumption that both devices, that is to say the transmitter and the receiver, are located in a traffic environment, that is to say for example on a road network, and that at least one of the two devices is moving. The transmitter and/or the receiver can thus be arranged in a corresponding motor vehicle. The movement involves, in particular, a relative movement between transmitter and receiver and a movement through the traffic environment, as a result of which the property of the radio channel existing between the transmitter and the receiver changes over time. The method is carried out by a control apparatus of the transmitter. On the one hand, the control apparatus ascertains environment data describing a predetermined nature of the traffic environment. For example, the environment data can indicate an average building density. In particular, a statistical or average environmental property is assumed. On the other hand, orientation data describing a relative orientation of the transmitter and the receiver to one another are ascertained by the control apparatus. These orientation data are not an absolute geoposition of the devices, but their relative orientation. From the environment data and the orientation data, the type of environment (for example city or open country) and the relative position or relative orientation in which the devices are located is therefore known in the control apparatus. Based on the environment data and the orientation data, the control apparatus uses a predetermined radio link model to forecast whether a currently selected coding configuration of the channel coding, that is, the currently used configuration data set, can be used to successfully decode and/or reconstruct a data packet currently needing to be sent of the data packets actually in the receiver. In other words, the radio link model is used to ascertain whether a disturbance in the data packet, which may arise after the data packet has been sent on the radio link, can be so strong or large that the data in the data packet can no longer be reconstructed completely or without errors in the receiver, that is, the transmitted data packet is unusable. Reconstruction means that error correction can also be included in order to decide whether the data packet can be correctly restored. So before the control apparatus sends out the data packet, it already uses the radio link model to decide whether the current coding configuration is sufficient for the channel coding. A coding configuration of the channel coding can, for example, define a degree of redundancy for the channel coding, that is to say, for example, the number of parity bits and/or a type of code used. A coding configuration can be defined by a corresponding value for at least one coding parameter of the channel coding.

If the forecast regarding the successful decoding and/or reconstruction does not signal success, but rather a failure, i.e. a non-decodable and/or non-reconstructable data packet is to be assumed, the control apparatus switches to a different coding configuration, which here is referred to as extended coding configuration, because it provides a greater redundancy in the channel coding of the data packet than the current coding configuration. Corresponding coding configurations, for example parameter settings, can be taken from the prior art depending on the channel coding method. The control apparatus therefore switches over to the extended coding configuration if the forecast does not indicate success. The data packet to be sent is then coded and sent with the extended coding configuration. The control apparatus in the transmitter can therefore decide without feedback from the receiver which coding configuration is suitable for sending the next data packet in order to ensure successful decoding and/or reconstruction of the data of the data packet in the receiver. The transmitter can learn or ascertain the orientation data, for example, from the receiver from a previous data transmission from the receiver to the transmitter. However, since no feedback with regard to the successful decoding and/or reconstruction is necessary, a coding configuration can be established in the transmitter with a lower data rate. The method is particularly suitable for configuring channel coding for mobile radio data communication, for example so-called V2X communication between a vehicle and another device, for example another motor vehicle or an infrastructure component of a road network. The data transmission can be based on a cellular standard, such as LTE or 5G, and/or on a WLAN standard (WLAN—Wireless Local Area Network). The method can be carried out in the context of a blind HARQ process, that is to say, the repeated transmission of a data packet (ARQ) or the forwarding of additional redundancy data upon request by the receiver can be provided.

Additional embodiments of the invention yield additional advantages.

In one embodiment, said environment data indicate one or more or each of the following environmental properties: a building density, a mean building height, a development type of the traffic environment. Such environmental properties can be taken, for example, from a road map or a navigation map of a navigation system of a motor vehicle. In particular, it is provided that the environment data describe a statistical mean value of the nature of the environment between transmitter and receiver. An exact description of individual buildings is therefore not necessary. As a result, the method can be used without prior, exact measurement of an area or a traffic environment. In addition or as an alternative to the above-mentioned environment data (building density, an average building height, a development type), other useful data can be used:

Average street length [meters]
Number of streets
Number of curves
Number of crossings
Share of the road network in the landscape area or scenario area [percent]
Average building footprint [square meters]
Number of buildings.

The number here means, in particular, an average number per specified unit of area, for example per square kilometer.

In one embodiment, the orientation data relate to the relative orientation regarding at least one or more or all of the following information items: a relative viewing direction in the form of a viewing direction angle (for example, measured in a horizontal plane), a height difference between transmitter and receiver, a distance between transmitter and receiver. The viewing direction angle can be measured, for example, with respect to a pre-alignment of the transmitter or the receiver, that is to say as an angle between the longitudinal axis or the forward axis (forward direction of travel) and the line between the transmitter and the receiver. A viewing angle of 0 degrees would then indicate that the receiver is in a straight line in front of the transmitter, a viewing angle of 90 degrees from the transmitter would indicate that the receiver is located abeam to the right of the transmitter. It has been found that if the nature of the surroundings is known, these orientation data are sufficient to ascertain a statistical statement about the success of the decoding and/or reconstruction of a data packet.

In order to make the statistical statement about the success of the decoding/reconstruction of the data packet from this, it is provided in one embodiment that the said radio link model includes that the presence or absence of a direct line of sight between transmitter and receiver is checked, i.e. regarding a decision, the existence of a direct line of sight is generated and a parameter of a calculation rule for a distance-dependent probability of success is set depending on the existence of the direct line of sight (as the decision indicates or signals). The radio link model is based on a calculation rule which, depending on the distance between transmitter and receiver, as can be signaled by the orientation data, ascertains how high the probability of success with regard to the decoding and/or reconstruction is. Such a calculation rule can be taken from the prior art; however, it requires a current parameter value for the parameter relating to the existence of the direct line of sight, as can now be recognized by means of the radio link model. A direct line of sight means here that the radio link is reflection-free, that is to say that no reflection is required, for example on a building wall and/or a panel of another vehicle.

In one embodiment, the existence of the line of sight in the radio link model is checked or ascertained by means of an artificial neural network. For this purpose, an artificial neural network is used which is trained to assign statement data to the ascertained environment data and orientation data (both represent input data of the neural network) (the statement data represent output data of the neural network). The statement data relate to the probability of the existence of the line of sight. It has been found that, by means of training an artificial neural network, a forecast or analysis can be provided to the effect that statement data relating to the existence of a line of sight can be generated solely on the basis of environment data and orientation data. Therefore it has been found that, for example, regardless of the type of environment, the existence of a line of sight can be recognized through an artificial neural network if the transmitter and the receiver are arranged directly one behind the other (viewing angle 0 degrees or 180 degrees), when this involves a data transmission between two vehicles, that is, the transmitter is arranged in a transmitting vehicle and the receiver is arranged in a receiving vehicle. A viewing angle between 0 degrees and 180 degrees, i.e. an inclined connecting line, on the other hand, results in a high probability of a lack of direct line of sight if the type of environment is an urban area, which can also be reliably assigned by an artificial neural network. However, these examples are very much simplified in order to illustrate that the probability of an existing line of sight is high at a viewing angle of 0 degrees or 180 degrees compared to other angles. However, the absolute probability value is in turn influenced by the type of environment. Thus, the existence of a line of sight under these conditions is not completely independent on the type of environment. Example: The more densely built-up the area, the more intersections it contains (especially T-intersections) and the shorter the streets (between intersections), the higher the probability that the line of sight is obstructed even at a viewing angle of 0 degrees or 180 degrees. Of course, this probability increases with increasing distance between transmitter and receiver. As this can be taken into account very efficiently by means of a neural network. Instead of or in addition to a neural network, a look-up table and/or a data model can also be used, for example.

If there is then a probability of the existence of the line of sight, a specific decision must be made for the present case. In one embodiment, a decision stage for generating a binary decision (i.e. a two-valued decision with the statement yes or no) regarding the existence of the line of sight is situated downstream of the artificial neural network (which signals the probability of the existence of the direct line of sight through the statement data). The decision stage thus receives the statement data relating to the probability of the existence of the direct line of sight and uses this to generate the binary decision, which represents a statement that either there is currently a direct line of sight or not. A decision stage can be implemented, for example, on the basis of a threshold value comparison of the probability specified in the statement data and/or on the basis of a Bernoulli distribution.

In the manner described, the probability of success for a transmission error is determined based on distance depending on the existence of the direct line of sight by means of said calculation rule. This probability of success is also preferably converted into a concrete statement, that is to say binary or two-valued (data packet can be successfully decoded/reconstructed or not, i.e. the statement yes or no). For this purpose, in one embodiment, a binary statement on the forecast regarding the success of the decoding/reconstruction of the data packet is generated or established in the radio link model from the probability of success by means of a decision step. This decision step can be carried out on the basis of a threshold value comparison of the ascertained probability of success to a threshold value and/or on the basis of a Bernoulli distribution, by means of which the concrete binary statement is assigned to the probability of success. Thus, in an advantageous manner, there is a binary statement in the control apparatus as to whether the data packet, if it were transmitted to the receiver using the current coding configuration, could also be successfully decoded and/or reconstructed in said receiver.

In one embodiment, the forecast is accordingly generated in the radio link model independently of a feedback from the receiver. That is, the decision or forecast regarding the success of the decoding/reconstruction is made or generated without information from the receiver (apart from its orientation data) regarding the decoding/reconstruction being necessary.

If the forecast is then negative, the coding configuration must be changed. For this purpose, a plurality of selectable coding configurations can be provided or, if necessary, can be generated. In one embodiment, each coding configuration provides that at least one configuration parameter (as defined by the coding configuration) is used to set at least one of the following properties of the channel coding: an error correction coding type, a redundancy component of the channel coding. By varying these properties, it is possible to react effectively to a changing traffic environment and/or a changing relative orientation of the transmitter and receiver in order to ensure successful data transmission of data packets.

So far it has been described that a switch is only ever made in the direction of an extended coding configuration, that is to say that the redundancy is increased during the transmission. In one embodiment, the radio link model is used to check whether a reduced coding configuration is possible, that is to say a coding configuration which results or has a lower redundancy than the current coding configuration. For this purpose, the said forecast of the success of the decoding/reconstruction of a data packet is also checked by means of the reduced coding configuration. If the forecast results in a success of a decoding/reconstruction of the data packet even with a reduced coding configuration, then in this case the reduced coding configuration is set and the data packet to be sent is sent out by means of the reduced coding configuration. This means that the redundancy can be reduced if more favorable or changed transmission conditions arise.

In order to carry out the method according to embodiments of the invention in a transmitter, a control apparatus for a transmitter is also provided. The transmitter has a processor device which is configured to carry out the method according to embodiments of the invention. For this purpose, the transmitter can have at least one processor and a data memory coupled to the at least one processor. A processor can be designed, for example, as a microprocessor or microcontroller or ASIC (Application Specific Integrated Circuit). Computer-readable instructions can be stored in the data memory which, when executed by the at least one processor, cause the processor to carry out the method according to embodiments of the invention. The transmitter can be, for example, a cellular module (for example for LTE or 5G) or a WLAN module.

The method according to embodiments of the invention can be used particularly advantageously in connection with vehicle communication. Accordingly, embodiments of the invention also provide a motor vehicle with a transmitter for transmitting data packets from the motor vehicle to a receiver external to the vehicle. In this case, the control apparatus according to embodiments of the invention is provided in the transmitter.

The motor vehicle according to embodiments of the invention is preferably designed as a car, in particular as a passenger car or truck or as a passenger bus or motorcycle.

Embodiments of the invention also include refinements of the method, which have features such as those that were previously described in connection with the refinements of the motor vehicle. For this reason, the corresponding refinements of the method according to embodiments of the invention are not described again herein.

Embodiments of the invention also comprise the combinations of the features of the described embodiments.

Various embodiments are explained below. In the embodiments, the described components of the embodiments each represent individual features of the invention which are to be considered to be independent of one another and which each further develop the invention independently of one another. Therefore, the disclosure shall also comprise combinations of the features of the embodiments other than the ones presented. Furthermore, the described embodiments may also be supplemented by further features of the invention as already described.

In the drawings, the same reference signs refer to functionally identical elements.

FIG. 1 shows a motor vehicle 10, which may be, for example, a motor vehicle, in particular a passenger car or truck or a passenger bus. A transmitter 11 can be provided in the motor vehicle 10, by means of which data packets 12 can be transmitted from the motor vehicle 10 one after the other or sequentially via a radio path or radio link 13 to a receiver 14 external to the vehicle. The data packets 12 can contain, for example, communication data (for example voice data from a telephone call and/or data from an Internet connection) and/or status data (for example for navigation) that are to be sent from the transmitter 11 to the receiver 14. The receiver 14 can, for example, be another motor vehicle or a station (infrastructure component).

To transmit the data packets 12 via the radio link 13, a transmission circuit 15 and a control circuit or control apparatus 16 for the transmission circuit 15 can be provided in the transmitter 11. The transmission circuit 15 can operate, for example, in one antenna 17 or a plurality of antennas in a manner known per se. The control apparatus 16 can provide a channel coding 18 for the radio transmission via the radio link 13, by means of which a data packet 12 to be sent is encoded in order to receive a coded data packet 19, which is sent out via the radio link 13 by means of the transmission circuit 15. By means of the channel coding 18, redundancy can be added or supplemented to the data of the data packets 12 in a manner known per se, which allows error detection and/or data reconstruction by decoding 20 of the receiver 14. In the receiver 14, a coded data packet 19 can be converted into a decoded data packet 21 by the decoding 20. As provided by the channel coding 18, the redundancy data is then used to check whether an error-free reconstruction of the data of the data packet 12 has taken place or not. The redundancy data of the channel coding 18 can be transmitted in a common coded data packet 19 or in at least one additional data packet via the radio link 13.

The channel coding 18 can have a plurality of different coding configurations 22 which can be accessed or switched over depending on a susceptibility to interference or a fault in the radio link 13. One of these can be a currently set coding configuration 22'. In order not to have to wait for a response from the receiver 14, orientation data 23 can be received from the receiver 14, which can describe a relative orientation 24 between transmitter 11 and receiver 14. In addition to the orientation data 23, the control apparatus 16 can ascertain environment data 25, which is ascertained, for example, on the basis of a current geoposition of the motor vehicle 10, as determined by a receiver of a GNSS (Global Navigation Satellite System), for example the GPS (Global Positioning System) can be taken from a digital road map 26. The environment data 25 can indicate, for the current traffic environment 27 through which the motor vehicle 10 is moving, what type of environment (for example a development type (urban, rural) and/or a building density and/or a mean building height) is present in the traffic environment 27.

A radio link model 28 can be operated by the control apparatus 16, by means of which forecast data for a forecast 29 can be generated depending on the environment data 25 and the orientation data 23. The forecast 29 can indicate whether a completely reconstructed data packet 21 can actually be successfully generated in the receiver 14 with a current coding configuration 22', as is currently provided or set for the generation of a coded data packet 19. This depends on how severe the interference is on the radio path or radio link 13.

In order to estimate this degree of interference on the radio link 13, the radio link model 28 can provide that an artificial neural network 30 is used to check whether a direct line of sight 31 or only an indirect line of sight 32 exists between transmitter 11 and receiver 14. The neural network 30 can provide here to only generate a corresponding probability specification or statement data 33 relating to the probability of the existence of a direct line of sight (line of sight probability). In a subsequent decision stage 34, a binary decision 37 can be generated from the probability according to the statement data 33, for example by means of a threshold value decision 35 and/or on the basis of a Bernoulli distribution 36. Corresponding decision data can indicate that the binary decision 37 states that the direct line of sight exists or that there is no line of sight. Instead of or in addition to a neural network 30, a look-up table and/or a data model can also be used, for example.

On the basis of the binary decision 37 and on the basis of the orientation data 23, in particular a distance D described by the orientation data between transmitter 11 and receiver 14, it can be provided, on the basis of a calculation rule 38, to calculate a probability of success E, which indicates how likely an unsuccessful or only faulty reconstruction of the data in the decoded data packet 21 would be if the current coding configuration 22' were used.

A functional relationship between distance D and the probability of success E can be set by means of a parameterization 39, which can be switched over depending on the binary decision 37 relating to the direct line of sight. Calculation rules 38 for the probability of success E can be derived depending on the distance D and for a direct and an indirect line of sight can be found in the technical literature. In addition to the distance D and the information about the direct/indirect line of sight 31, 32, the communication technology with its parameters (e.g. message size [byte], transmission power [mW], reception sensitivity [dB]) and/or the current channel load can also be taken as the basis for the parameterization 39 of the calculation rule 38.

On the basis of the probability of success, a subsequent decision step 40 can generate a binary statement 43, for example on the basis of a threshold value comparison 41 and/or on the basis of a Bernoulli distribution 42, which indicates whether the receiver will be successful using the current coding configuration 22', to successfully decode the data packet encoded by means of the current encoding configuration 22'. Therefore, this binary statement 43 then represents said forecast 29.

If the forecast is negative, it is possible to switch to another, extended coding configuration 22 which provides more redundancy data (redundancy bits) in the channel coding 18 than the current coding configuration 22'. If on the other hand the forecast 29 is positive, the current coding configuration 22' can be used, or it can be checked whether a positive forecast can also be obtained with a reduced coding configuration 22, which provides less redundancy data than the current coding configuration 22'. The reduced coding configuration 22 can then also be used.

Figure 2:
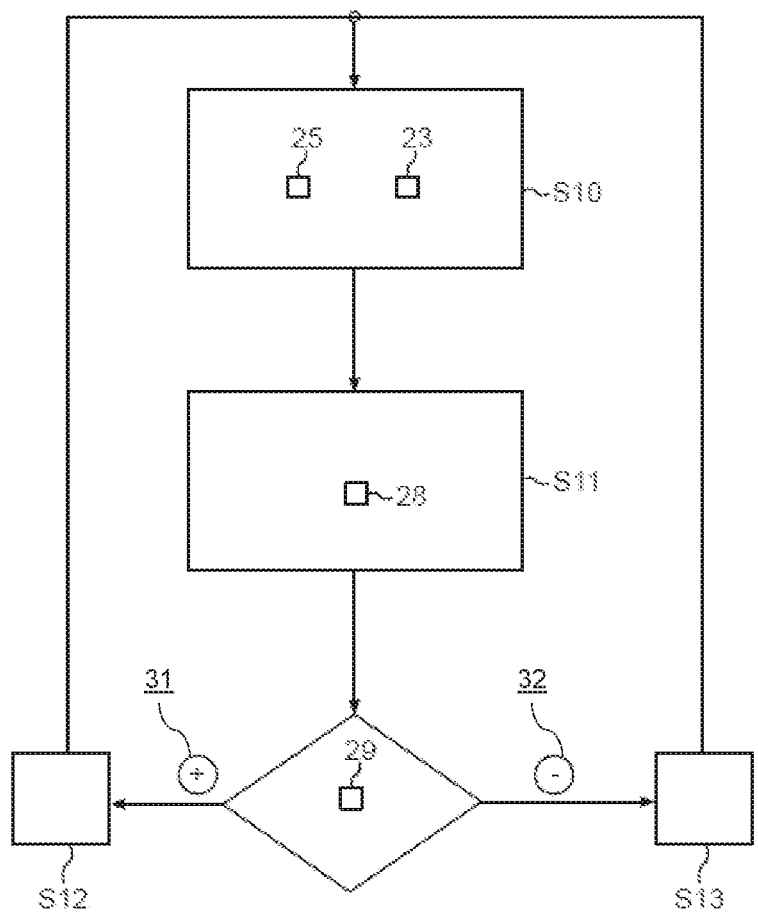
FIG. 2 illustrates a flow diagram illustrating the method, according to certain embodiments of the invention.

FIG. 2 again illustrates a basic sequence of a method that can result from the operation of the control apparatus 16. In the control apparatus 16, this method can be implemented, for example, on the basis of a program code for a processor device of the control apparatus 16. In particular, said radio link model 28 can be implemented on the basis of a program code.

According to the method, the environment data 25 and the orientation data 23 can be ascertained in a step S10.

In a step S11, the forecast regarding successful decoding/reconstruction of the data of a data packet 12 can be ascertained by means of the radio link model 28 on the basis of the environment data 25 and the orientation data 23, provided that a currently set coding configuration 22' is used.

If the forecast is positive, i.e. if the current coding configuration 22' is sufficient for a successful transmission, then in a step S12 the data packet 12 to be sent can be converted into a coded data packet 19 using the current coding configuration 22' or even with a reduced coding configuration 22 and sent out. If, on the other hand, the forecast is negative, then in a step S13 a switch can be made to an extended coding configuration 22, and the data packet 12 currently to be sent can be converted into a coded data packet 19 by means of the extended coding configuration 22 and sent out.

It is then possible to continue with the next data packet 12 that is to say to return to step S12. The update of the forecast 29 can be provided for each data packet 12 to be sent or for a predetermined group of data packets 12.

The coding configurations 22 can in particular relate to a blind HARQ process of the channel coding 18. A HARQ (Hybrid Automatic Repeat Request) process is a method in which channel coding and the additional transmission of redundancy work together to increase the probability of successful decoding of the transmitted information. With blind HARQ, the additional redundancy is not specifically requested by the receiver, but added to the original transmission. The additional redundancy in the blind HARQ process can be kept low by means of the method described.

The idea in the presented method is to adapt the amount of information transmitted in the blind HARQ process to a previously estimated probability of success. The estimation of the probability of success takes into account the development and topology of the traffic environment 27 in which the communication takes place, as well as the communication technology used.

The advantage of the adaptive blind HARQ process created in this way lies in the reduction of the channel load compared to the previous blind HARQ process with the same communication success and thus in the elimination of the disadvantage described.

A neural network 30 is preferably trained in such a way that it is based on the properties of a surrounding area (buildings, vegetation, course of the road, elevation . . . ), on the basis of the properties of a communication technology and/or a specific local transmitter-receiver relationship at a transmission time for a direct line of sight between transmitter and receiver in this environment. The transmitter-receiver relationship is described geometrically, for example by means of the angle, distance and height difference between transmitter and receiver at the time of transmission. The artificial neural network 30 can be queried separately and in real time for each transmission process and each transmitter-receiver relationship. The neural network can be operated online or queried once before use for all potential transmitter-receiver relationships and the result for a plurality of different loading data and environment data can be stored in a look-up table.

The information about an existing or non-existing line of sight is generated as a decision 37 from the line-of-sight connection probability output by the artificial neural network 30 between transmitter and receiver at the time of transmission.

A model with a calculation rule 38 outputs the probability of success of a transmitter-receiver relationship at the time of transmission depending on the presence of an ascertained (non) visual connection between transmitter and receiver and the geometric relationship between transmitter and receiver.

The information about successful or unsuccessful communication between the transmitter and receiver under consideration at the analyzed transmission time can be generated from the ascertained probability of success E.

The mentioned method can be used to optimize a blind HARQ process, for example for V2X. The idea in the presented method is to adapt the amount of information transmitted in the blind HARQ process using the presented methodology for estimating the probability of success E.

Overall, the examples show how embodiments of the invention can be used to adapt a blind HARQ process for vehicle-to-X communication (V2X) on the basis of an estimated probability of success.

The invention claimed is:

1. A method for configuring a channel coding during a transmission of data packets from a transmitter to a receiver, which are both located in a traffic environment and of which at least one is moving, the method performed by a control apparatus of the transmitter, the method comprising:

ascertaining environment data and orientation data, the environment data describing a predetermined environmental quality of the traffic environment, and the orientation data describing a relative orientation of the transmitter and the receiver to one another;

forecasting whether a currently selected coding configuration of the channel coding can be used to successfully decode and/or reconstruct a data packet of the data packets currently needing to be sent in the receiver, wherein the forecasting uses a predetermined radio link model, the environment data and the orientation data;

based on the forecasting indicating a lack of success, switching to an extended coding configuration that produces greater redundancy than the currentl selected coding configuration;

checking, by the radio link model, whether a reduced coding configuration results in a forecast of success, wherein the reduced coding configuration has a lower redundancy than the currently selected coding configuration, and if success is forecasted, setting the reduced coding configuration; and coding the data packet to be sent and sending using the extended coding configuration, wherein using the radio link model includes generating a decision regarding an existence of a direct line of sight, and, if the existence of the direct line of sight is signaled, a parameter of a calculation rule for a distance-dependent probability of success (E) regarding the decoding and/or reconstructing of the data packet is set, the existence of the direct line of sight in the radio link model being determined using an artificial neural network which is trained to assign statement data relating to a probability of the existence of the direct line of sight to the ascertained environment data and orientation data.

2. The method according to claim 1, wherein the environment data specifies at least one of the following environment properties: a building density, a mean building height, a development type of the traffic environment, an average street length, a number of streets, a number of curves, a number of intersections, a proportion of the road network in a landscape area, an average building footprint, or a number of buildings.

3. The method according to claim 1, wherein the orientation data regarding the relative orientation includes at least one of the following: a relative viewing angle, a height difference, or a distance.

4. The method according to claim 1, further comprising generating, by a decision stage, a binary decision regarding the existence of the direct line of sight, wherein the decision stage follows the artificial neural network in the radio link model.

5. The method according to claim 1, wherein a binary decision is generated in the radio link model from the probability of success (E) using a decision step.

6. The method according to claim 1, wherein the forecasting is performed in the radio link model independently of any feedback from the receiver.

7. The method according to claim 1, wherein each coding configuration provides that at least one of the following properties of the channel coding is set by at least one configuration parameter of the following: an error correction coding type, or a redundancy portion of the channel coding.

8. A control apparatus for a transmitter, wherein the control apparatus has a processor device that provides a channel coding during a transmission of data packets from the transmitter to a receiver, which are both located in a traffic environment and of which at least one is moving, wherein computer-readable instructions are stored in a data memory which, when executed by the processor device, cause the processor device to perform operations comprising:

ascertaining environment data and orientation data, the environment data describing a predetermined environmental quality of the traffic environment, and the orientation data describing a relative orientation of the transmitter and the receiver to one another;

forecasting whether a currently selected coding configuration of the channel coding can be used to successfully decode and/or reconstruct a data packet of the data packets currently needing to be sent in the receiver, wherein the forecasting uses a predetermined radio link model, the environment data and the orientation data;

based on the forecasting indicating a lack of success, switching to an extended coding configuration that produces greater redundancy than the currently selected coding configuration;

checking, by the radio link model, whether a reduced coding configuration results in a forecast of success, wherein the reduced coding configuration has a lower redundancy than the currently selected coding configuration, and if success is forecasted, setting the reduced coding configuration; and coding the data packet to be sent and sending using the extended coding configuration, wherein using the radio link model includes generating a decision regarding an existence of a direct line of sight, and, if the existence of the direct line of sight is signaled, a parameter of a calculation rule for a distance-dependent probability of success (E) regarding the decoding and/or reconstructing of the data packet is set, the existence of the direct line of sight in the radio link model being determined using an artificial neural network which is trained to assign statement data relating to a probability of the existence of the direct line of sight to the ascertained environment data and orientation data.

9. A motor vehicle comprising a transmitter for transmitting data packets from the motor vehicle to a receiver external to the vehicle, wherein a control apparatus comprises a processor device that provides a channel coding during a transmission of the data packets from the transmitter to the receiver, which are both located in a traffic environment and of which at least one is moving, wherein computer-readable instructions are stored in a data memory which, when executed by the processor device, cause the processor device to perform operations comprising:

ascertaining environment data and orientation data, the environment data describing a predetermined environmental quality of the traffic environment, and the orientation data describing a relative orientation of the transmitter and the receiver to one another;

forecasting whether a currently selected coding configuration of the channel coding can be used to successfully decode and/or reconstruct a data packet of the data packets currently needing to be sent in the receiver, wherein the forecasting uses a predetermined radio link model, the environment data and the orientation data;

based on the forecasting indicating a lack of success, switching to an extended coding configuration that produces greater redundancy than the currently selected coding configuration;

checking, by the radio link model, whether a reduced coding configuration results in a forecast of success, wherein the reduced coding configuration has a lower redundancy than the currently selected coding configuration, and if success is forecasted, setting the reduced coding configuration; and coding the data packet to be sent and sending using the extended coding configuration, wherein using the radio link model includes generating a decision regarding an existence of a direct line of sight, and, if the existence of the direct line of sight is signaled, a parameter of a calculation rule for a distance-dependent probability of success (E) regarding the decoding and/or reconstructing of the data packet is set, the existence of the direct line of sight in the radio link model being determined using an artificial neural network which is trained to assign statement data relating to a probability of the existence of the direct line of sight to the ascertained environment data and orientation data.

* * * * *